May 21, 1935.  M. CLARK ET AL  2,001,815
KITCHEN UTENSIL
Filed Nov. 4, 1933  2 Sheets-Sheet 1
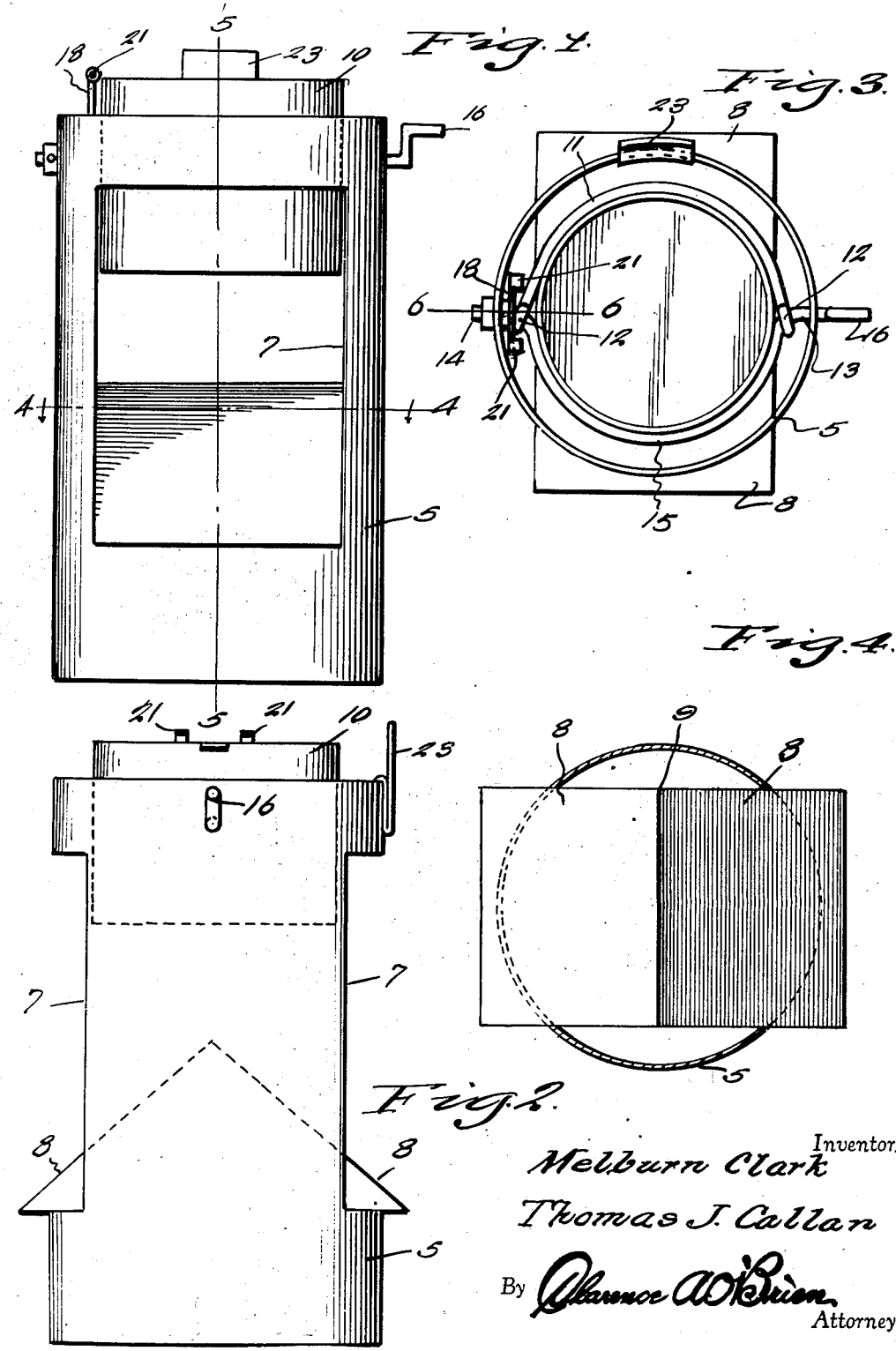

May 21, 1935.    M. CLARK ET AL    2,001,815
KITCHEN UTENSIL
Filed Nov. 4, 1933    2 Sheets-Sheet 2
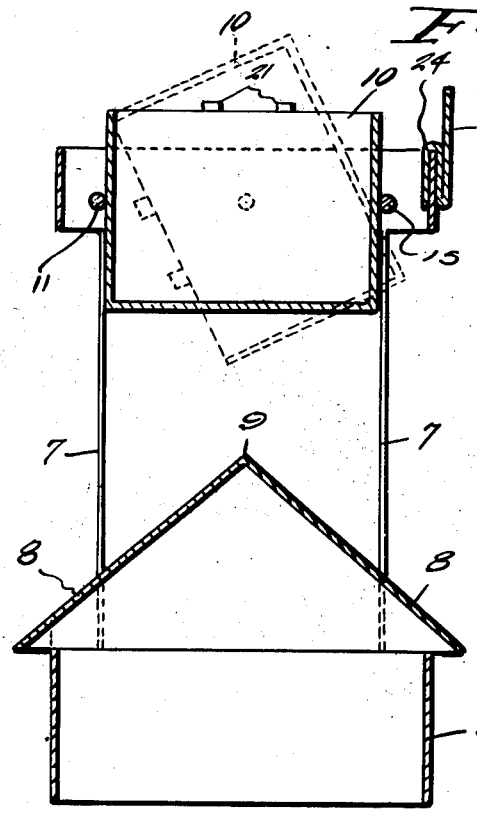
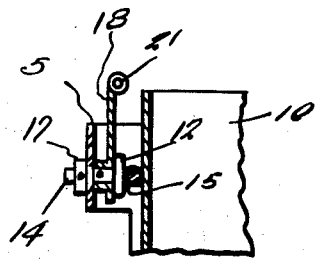
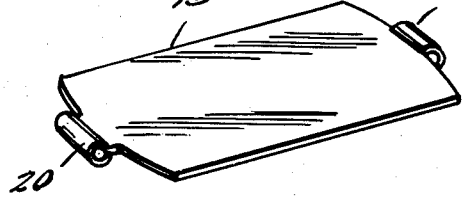
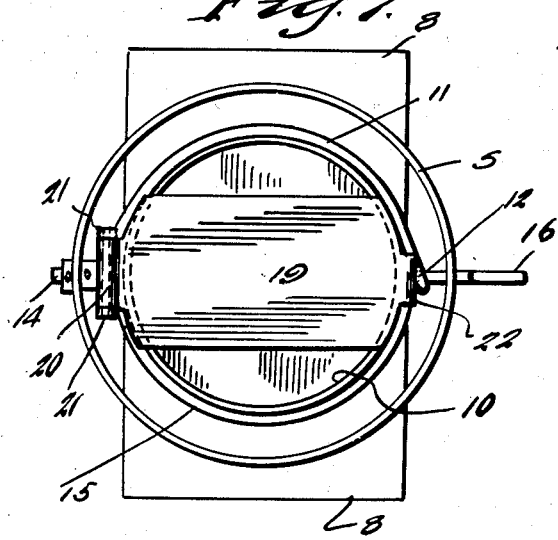
Inventors
Melburn Clark
Thomas J. Callan
By Clarence A. O'Brien
Attorney Patented May 21, 1935

2,001,815

UNITED STATES PATENT OFFICE 2,001,815

KITCHEN UTENSIL

Melburn Clark and Thomas J. Callan, Vallejo, Calif.

Application November 4, 1933, Serial No. 696,639½

1 Claim. (Cl. 146—2)

This invention appertains to new and useful improvements in egg separators and more particularly to a separator which can be used handily for domestic or household purposes.

An important object of the present invention is to provide a separator constructed in such a manner as to permit separation of the whites from the yolks in a convenient and easy manner.

Another important object of the invention is to provide an egg handling device into which eggs can be broken and subsequently discharged selectively into one or another of two receptacles.

Various other important objects and advantages of the invention will become apparent to the reader of the following specification.

In the drawings:

Figure 1 is a front elevational view of the device.

Figure 2 is a side elevational view of the device.

Figure 3 is a top plan view of the structure.

Figure 4 is a horizontal sectional view taken substantially on line 4—4 of Figure 1.

Figure 5 is a vertical sectional view taken substantially on line 5—5 of Figure 1.

Figure 6 is a fragmentary vertical sectional view taken substantially on line 6—6 of Figure 3.

Figure 7 is a top plan view of the device with the separator plate mounted thereon for use.

Figure 8 is a perspective view of the separator plate.

Referring to the drawings wherein like numerals designate like parts, it can be seen that the device consists of a vertically disposed cylindrical wall 5 having vertically extending openings 7—7 in the side thereof and at diametrically opposite points. A pair of slideways 8—8 forming a chute extend upwardly through the openings 7—7 and converge at a point defining a dividing ridge 9 located a short distance under the revolving receptacle 10. A yoke structure supports the receptacle 10 and consists of a bail like member 11 having eyes 12—12 at its ends through which the alined end portions 13 and 14 of the curved member 15 extend. In this manner a substantially circular clamp or yoke is provided for the receptacle which supports the receptacle in the manner shown while the extensions 13 and 14 extend through openings in the side of the cylindrical wall 5. As will be observed in Figure 3, the extension 13 is provided with a crank handle 16 while the end 14 has a stop collar 17 thereon. At the inside of the wall 5 is located a hinge plate 18 having an opening therein through which the extension 14 is disposed and to which the said plate 18 is secured.

Numeral 19 represents the separator plate which is provided with a hinge barrel 20 at one end for interposition between the hinge eyes 21 on the upper end of the hinge plate 18 so that a pin disposed through the barrel and eyes will hingedly connect the plate 19 to the plate 18. A spring fastener 22 is provided on the opposite end of the plate 19 for engaging the edge portion of the receptacle 10 so as to retain the separator plate 19 in the position shown in Figure 7.

A cracker against which the eggs may be struck, as shown in Figure 5, consists of an upstanding blade member 23 having a U-shaped clip structure 24 at its lower portion for engagement over the upper edge of the cylindrical wall 5.

In the use of the device it can be seen that the receptacle 10 can be employed without the separator plate, as when it is desired only to inspect the eggs and distribute the same as to quality into one receptacle or another located at the lower ends of the chute 8—8. The egg, for instance, is cracked on the blade 23 and dropped into the receptacle 10 where it is inspected as to its quality, and then the receptacle 10 is rotated to the dotted line position shown in Figure 6 or in the opposite direction so as to discharge the egg on to one or the other of the two chutes 8—8 which discharge into separate bowls or receptacles.

When it is desired that the device be employed for separating eggs, the plate 19 is positioned in the manner shown in Figure 7, so that when an egg is cracked and dropped into the receptacle 10, the separator 19 can be disposed over the receptable and fixed in the manner shown in Figure 7 so that when the receptacle 10 is rotated, only the white of the egg will become displaced therefrom, the plate 19 serving to retain the yolk until the receptacle is rotated in the opposite direction with the plate 19 removed so as to discharge the yolk onto the remaining chute or incline 8.

While the foregoing specification sets forth the invention in specific terms, it is to be understood that numerous changes in the shape, size, and materials may be resorted to without departing from the spirit and scope of the invention as claimed hereinafter.

Having described the invention what is claimed as new is:

An egg handling device of the character described comprising an upstanding casing having openings in a pair of opposed side portions, chutes extending through the said openings to merge together in the casing, and a rotatable receptacle mounted within the upper portion of the casing, said receptacle being adapted to be tilted to discharge its contents onto one or the other of the said chutes, said receptacle being provided with a yoke having pintle extensions for disposition through the side wall of the casing, one of the said pintles being equipped with a crank handle, an upstanding hinge plate secured to one of the said pintles, and a separator plate hingedly connected at one end to the said hinge plate and adapted for disposition across the top of the receptacle so as to permit only the discharge of egg white when the receptacle is tilted.

MELBURN CLARK.
THOS. J. CALLAN.